Sept. 9, 1952 H. A. JACKSON 2,609,538
GOGGLES
Filed Jan. 26, 1949 2 SHEETS—SHEET 1
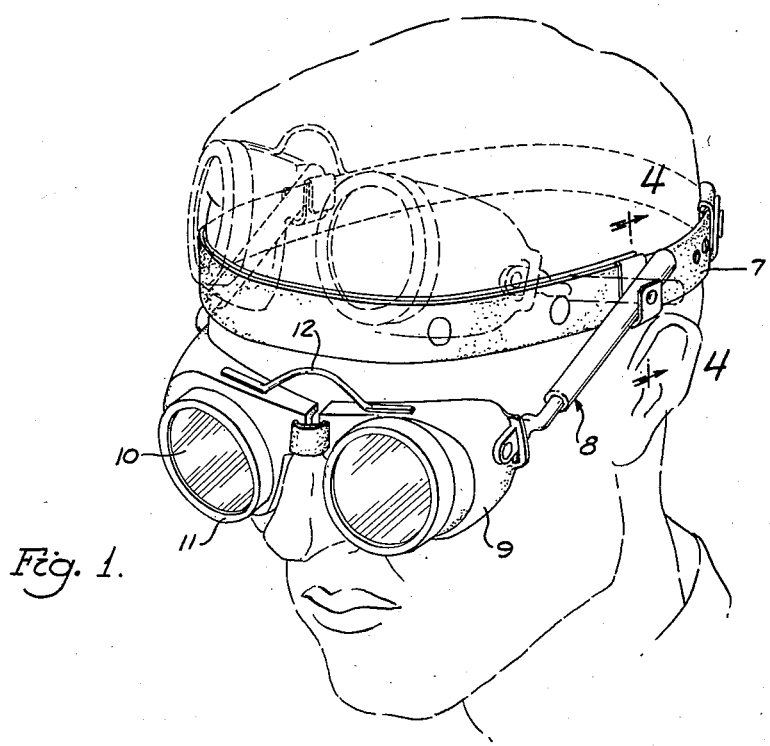
Fig. 1.
Fig. 2.
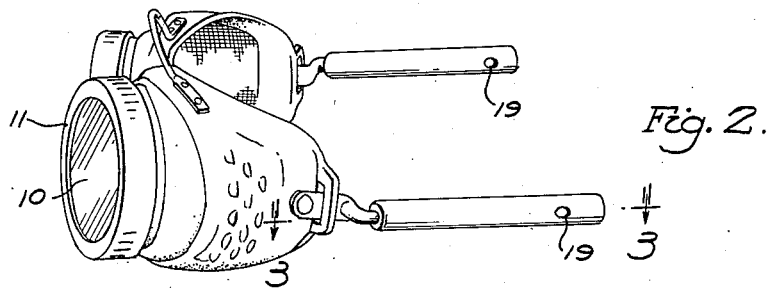
INVENTOR.
Honel A. Jackson
BY
Barnes Kisselle Laughlin & Raisch
ATTORNEYS.

Sept. 9, 1952　　　　　H. A. JACKSON　　　　　2,609,538
GOGGLES

Filed Jan. 26, 1949　　　　　　　　　　　　　　　2 SHEETS—SHEET 2

INVENTOR.
Honel A. Jackson
BY
Barnes, Kisselle, Laughlin & Raisch
ATTORNEYS.

Patented Sept. 9, 1952

2,609,538

UNITED STATES PATENT OFFICE 2,609,538

GOGGLES

Honel Acetin Jackson, Warren, Mich.

Application January 26, 1949, Serial No. 72,878

8 Claims. (Cl. 2—14)

This invention relates to goggles and more particularly to goggles having a head band which is readily disconnectable from the temples for replacement.

In goggles which are commonly used for protection of the eyes of the operator, for example, during grinding or welding operations, it is almost the universal practice to pivotally connect the temple with the head band with a fixed pivot. This is disadvantageous and uneconomical because quite frequently the head band will break or be destroyed while the temples, eye glasses and supports therefor are still in good condition but the breaking of the one element requires the purchase of the entire assembly.

It is the object of this invention to produce goggles in which the head band can be readily replaced in case it is damaged in use. This object is accomplished by providing a readily disconnectable connection between the temples and the head band.

This invention also contemplates goggles in which the temples are pivotally connected to the head band with a simple disconnectable pivot which is relatively inexpensive to fabricate and assemble.

In the drawings:

Fig. 1 is a perspective view showing my goggles in use.

Fig. 2 is a detail elevation showing the temples and eyepieces and frames disconnected from the head band.

Figure 3:
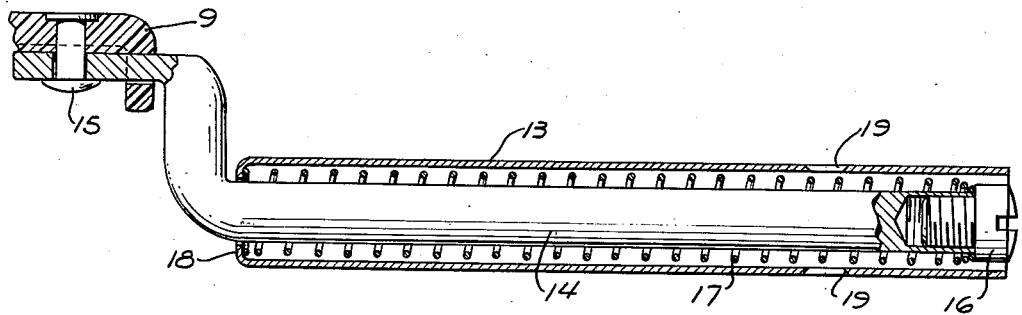
Fig. 3 is a section along the line 3—3 of Fig. 2.
Figure 4:
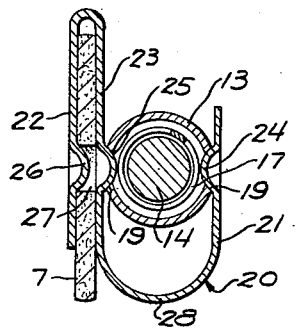
Fig. 4 is a section along the line 4—4 of Fig. 1.
Figure 5:
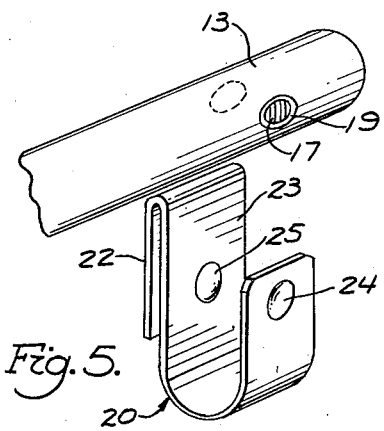
Fig. 5 is an enlarged detail fragmentary view showing the pivotal connection between the temple and the spring clip which is secured to the head band.

Referring more particularly to the drawings it will be seen that my goggles comprise an adjustable head band 7 which can be made of leather, rubber, plastic or any other suitable material, temples 8, shields 9, lenses 10, and lens frames 11. Shields 9 are connected together by the spring member 12.

Each temple comprises an outer tubular member 13, a rod 14 telescoped within the tubular member and pivotally connected at one end to its respective shield 9 by pivot pin 15. The other end of temple rod 14 is tapped and provided with a lag screw 16 threaded therein. The compression spring 17 is mounted over rod 14 and held in compression between the head of lag screw 16 and the closed end 18 of tube 13. The two temples and their pivotal connections to the head band 7 are identical.

The tube member 13 is provided with a pair of diametrically opposed openings 19 formed therein. Tube member 13 can be made of metal, plastic, hard rubber, or any other suitable material. Each temple is connected to the head band 7 by a spring metal clip generally designated 20. The spring metal clip 20 comprises a U portion 21 opening upwardly and a U portion 22 opening downwardly. U portions 21 and 22 have a common leg portion 23. U portion 21 is provided with two opposed identations or semispherical bumps 24 and 25 which are stamped or otherwise formed in the legs of the U. U portion 22 is provided with an indentation or hemispherical bump 26 which is arranged to interengage head band 7 in opening 27 to thereby clamp each clip 20 to head band 7.

To assemble the temples to the head bands, each temple is simply forced into the open end of U portion 21 whereby it rides over bumps 24 and 25 expanding the legs of the U members until bumps 24 and 25 snap into and yieldably interengage opposed openings 19 in temple members 13. Thus, bumps 24 and 25 cooperate with openings or sockets 19 to form a pivotal connection between temples 8 and head band 7. As shown in Fig. 1, the bight portion 28 of the U portion 21 of each clip serves as a stop to limit the upward and downward pivoting of the temples relative to head band 7. The range through which temples 8 can swing relative to head band 7 will be more than ample to bring the lenses and shields 9, 10 into the operative position, full line showing, Fig. 1, and into the inoperative position, dotted line showing, Fig. 1.

If at any time the head band 7 wears out or is destroyed or if for any reason new temples are desired while the head band is still in good usable condition, the head band can be readily disconnected from the temples by simply forcing the temples out of spring clips 20 whereupon the bumps 24 and 25 will disengage from their sockets 19.

Figure 6:
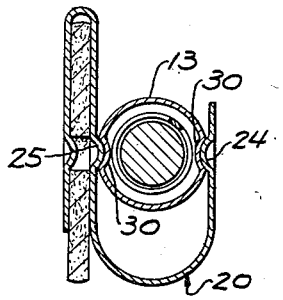
Fig. 6 is a sectional view similar to Fig. 4 but showing a modified form of pivotal connection.

The only difference between the modified form of pivotal connection shown in Fig. 6 and that shown in Figs. 1 to 5 is that the sockets 30 in each temple tube 13 take the form of opposed indentations or hemispherical sockets rather than full openings or holes, such as referenced 19 in the principal form of the invention.

From the above it is evident that the head band 7 can be readily replaced whenever desired or necessary. If it is desired for a plurality of workmen to use the same lenses 10, frames 11, guards 9 and temples 8, they each have their individual head bands 7 owing to the easy and quick manner in which the head bands can be assembled to, and disassembled from, the temples.

Clip 20 can be readily removed from head band 7 by simply springing spring leg 22 outwardly to disengage bump 26 from opening 27 whereupon the clip 20 is easily slidable off of band 7. Spring leg 22 can be sprung outwardly very easily by inserting a thin instrument or implement between the leg 22 and band 7. Clip 20 is easily assembled to band 7 by simply placing the end of band 7 between the free end of leg 22 and leg 23 and forcing the band upwardly whereupon engagement of the band with bump 26 springs leg 22 outwardly until bump 26 snaps into opening 27 to yieldably interengage the band and clip.

Figure 7:
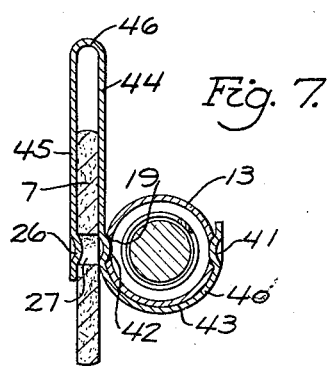
Fig. 7 is a sectional view similar to Fig. 6 but showing a second modified form of pivotal connection between the temple and the head band.

In Fig. 7 I have shown a modified form of my invention wherein spring clip 20 is connected to temple 13 by means of bumps 41 and 42 which interengage temple 13 in openings 19. The bight portion 43 of clip 40 has only a small clearance with temple 13 so that only a very small pivotal action can occur between temple 13 and clip 40. However, the bight portion 46 between legs 44 and 45 of clip 40 have sufficient clearance with band 7 to permit the band to pivot relative to clip 40 so that temples 8 can be very easily swung through a larger range than is necessary to position the temples 8 in operative position, full line showing Fig. 1, and upwardly to the inoperative position, dotted line showing Fig. 1. The pivotal connection between clip 40 and band 7 is effected by bump 26 interengaging in opening 27.

I claim:

1. In a pair of goggles comprising a head band member and a temple member, a disconnectable connection between said temple member and the head band comprising a spring clip having a U portion with a pair of opposed bumps in the U portion, the temple member being positioned between the legs of the U portion and having sockets therein cooperating and interengaged with said bumps whereby the temple member is free to pivot relative to said clip, and means for securing the clip to said head band.

2. The combination claimed in claim 1 wherein the temple member is tubular.

3. The combination claimed in claim 2 wherein said means for securing the clip to said head band comprises a second portion on the clip in the form of a U portion, the last mentioned U portion and the head band carrying interengaging bump and socket elements for releasably securing the clip to the head band, said last mentioned interengaging bump and socket elements, when interengaged, serving to positively locate the clip on the head band.

4. The combination claimed in claim 3 wherein the said bump is in an outer leg of the U portion and the cooperating socket is in the band.

5. In a pair of goggles comprising a head band and a temple member, a U clip for pivotally interconnecting said head band and temple member, means for securing the U clip to the head band, and cooperating bumps and sockets carried by said U portion of the clip and the temple member for pivotally supporting the temple member between the legs of the U portion of the clip.

6. The combination claimed in claim 5 wherein the clip is provided with a third leg portion forming a second U portion reversely positioned to the first U portion and having one leg in common with the first U portion, a bump in said third leg, and a socket in the head band interengaged with said bump for yieldably securing the spring clip to the head band.

7. In a pair of goggles comprising a head band member and a temple member, a disconnectable connection between said temple member and the head band comprising a resilient clip mounted on one of said members, and interengaged bump and socket parts carried by said clip and the other of said members for yieldably and pivotally connecting said clip and other member together, the portion of the clip carrying said bump and socket parts being in the form of a U, the member pivotally connected with the clip being positioned between the legs of said U, and the bight portion of said U having a clearance with said last mentioned member whereby the member and clip are free to pivot one relative to the other.

8. In a pair of goggles comprising a head band member and a temple member, a disconnectable connection between said temple member and the head band comprising a resilient clip mounted on one of said members, and interengaged bump and socket parts carried by said clip and the other of said members for yieldably and pivotally connecting said clip and other member together, the bump and socket parts being carried by the clip and the head band, the portion of said clip carrying said bump and socket parts being in the form of a U, said U portion being mounted over and interengaged with said head band, the bight portion of said U having a clearance with said head band whereby the head band and the clip are free to pivot one relative to the other.

HONEL ACETIN JACKSON.

REFERENCES CITED

The following references are of record in the file of this patent:

UNITED STATES PATENTS

| Number | Name | Date |
| --- | --- | --- |
| 374,702 | Rand | Dec. 13, 1887 |
| 1,711,463 | Paul | Apr. 30, 1929 |
| 2,353,043 | Kraski et al. | July 4, 1929 |
| 2,447,083 | Moeller | Aug. 17, 1948 |